April 7, 1959    C. G. O'NEILL    2,880,710
SELF ADJUSTING TAPPETS
Filed Nov. 4, 1957
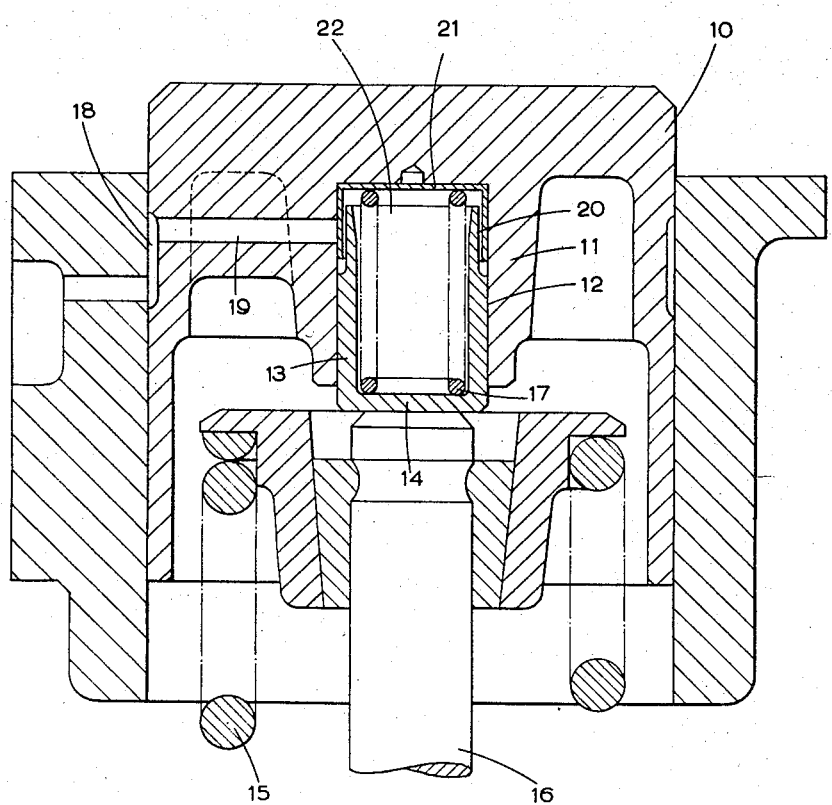
CORMAC GARRETT O'NEILL
INVENTOR
by *Irwin S. Thompson*
ATTORNEY United States Patent Office 2,880,710
Patented Apr. 7, 1959

2,880,710
SELF ADJUSTING TAPPETS

Cormac Garrett O'Neill, St. Albans, England, assignor to Engineering Research and Application Limited, a British company Application November 4, 1957, Serial No. 694,194

Claims priority, application Great Britain November 7, 1956

9 Claims. (Cl. 123—90)

This invention relates to cam followers or tappets, which are employed in the operation of the inlet and exhaust valves of internal combustion engines and more especially to followers of a type known in the trade as "inverted pot" cam followers.

In such a follower arrangement the valve is provided at the upper end of its stem with an "inverted pot" which is a hollow cylindrical member closed at its upper end. The inverted pot slides closely within a bore in the tappet carrier on the cylinder head of an internal combustion engine and is engaged on its upper surface by a cam which is rigidly mounted on a shaft which is held in bearings along the upper part of the tappet carrier. The valve spring is positioned within the pot and seats against a valve spring cap which is held by collets on the valve stem. For adjustment of this arrangement, shims are placed between the pot and the upper end of the stem.

This arrangement has the disadvantage that fine adjustment of the tappet to substantially eliminate tappet noise becomes difficult on production assembly.

It is the object of this invention to provide a self adjusting tappet in which the clearance between the tappet and cam is substantially reduced to zero during the whole cycle of operation and thereby overcomes the assembly time in adjusting clearance by shimming and maintains correct adjustment over a long period of engine service.

According to the invention a self-adjusting tappet is provided in which an inverted pot cam follower is used in combination with a hydraulic adjuster arrangement, in which the follower is provided with a bore into which a plunger for moving the engine valve is movably located thereby forming a chamber within said bore, said plunger having a clearance in the bore sufficient to permit a small leakage of hydraulic fluid from said chamber, said follower having a supply channel whereby said chamber is fed with an hydraulic fluid through a flap valve which is fitted within the follower and which opens and closes said supply channel according to the pressure within the chamber, and a spring means urging the follower towards the cam and the plunger towards the valve.

A constructional form of the invention will now be described with reference to the accompanying drawing in which the flap valve is a non-return sleeve valve.

An inverted pot 10 is provided with an internal central boss 11 which is formed having a cylindrical bore 12 axial of the reciprocating direction of the pot. Within the bore slides a plunger 13 which fits with an oil clearance of about one thousandth of an inch. The plunger 13 comprises a hollow cylindrical body which is closed at its lower end by an end wall 14 formed integrally with the body.

A valve spring 15 loads the valve against the valve seat in the cylinder head, pressure being applied to the valve through the usual collar and collets. The plunger 13 is maintained in contact with the end of the valve stem 16 by a light spring 17 acting between the plunger and the inverted pot 10. During the opening period of the valve, however, the compression load of the valve spring 15, and all inertia loadings due to acceleration of the valve masses, is carried by the plunger 13 since during this period the valve is lifted clear of the valve seat by the action of the cam and the hydraulic tappet assembly.

An annular groove 18 is provided around the pot 10 at a short distance from the upper surface of the pot, and contains one or more supply channels 19 which are each approximately one-sixteenth of an inch in diameter. These channels 19 pass through the pot in a radial direction and communicates with the bore 12.

The plunger 13 is relieved for approximately half its length and a cylindrical space 2 is thereby formed at the upper end of the bore into which is fitted a flap valve 21 which is pot-shaped and formed of nylon or some other suitable plastic. This nylon valve 21 which has a flexible wall having a thickness of between five to fifteen thousandths of an inch, engages the upper end of the bore 12 and partially fills the space leaving a cavity 20. The length of the nylon valve is at least two thirds of the length of the relieved portion of the plunger so that the cavity is in communication with the wall of the bore.

The nylon valve 21 is held in position by its contact with the upper end of the light spring 17 carried within the plunger.

The nylon valve is provided to cover the supply channel 19 at the position of entry into the bore 12, and it may be formed having slots on both sides of each position which is opposite a channel, so that a hinged portion is formed giving further resilience to the valve. The plunger is chamferred at its upper inside edge.

The operation of this self adjusting tappet is as follows:

When the valve is in its closed position the annular groove 18 is charged with oil from a channel which is connected to the pressurised oil feed from the engine's main gallery. Oil is thereby fed through the radial channel 19, opens the nylon valve and flows into the cavity 20 and the chamber 22 within the plunger.

As the camshaft rotates bringing the lifting contours of the cam profile into contact with the upper surface of the invented pot tappet 10, the tappet moves down and compresses both the light spring 17 and the oil within the cavity 20 and chamber 22. The oil presure holds the nylon valve 21 firmly against the channel openings so that the force exerted by the oil which is substantially incompressible, moves the plunger 13 down and in this way opens the engine valve. The supply channel may be shut off by the pot as the latter moves down.

Whilst the force is being exerted, for a very short time, i.e., during the lifting period, a small quantity of oil is forced from the cavity through the clearance between the bore and the plunger, and flows downwards and around the valve stem to join the usual lubricating oil supply of the engine.

As the camshaft continues to rotate the non-lifting part of the cam is reached and at this point due to the small loss of oil occurring during this lifting period, a small clearance will occur between the plunger and the valve stem. Under these conditions the oil supply pressure to the tappet will exceed the pressure in the volume within the cavity 20 and oil under a pressure of say 10 lb. per sq. in. will flow past the nylon valve to replace the oil lost and to take up the tappet clearances.

If there is some ingress of air to the cavity which rises to the uppermost end of the bore, it is compressed on the following stroke, and forced between the bore and the plunger and thereby removed with the leakage of oil.

If however, a cosiderable quantity of air is drawn into the cavity or the nylon valve should fail to seal due to the ingress of dirt or mechanical failure of the valve itself, then during the lifting stroke the plunger will make contact with the under surfaces of the inverted pot and in this way transfer the motions of the tappet to the valve stem. Under these conditions the tappet clearance is limited by the distance between the top of the plunger and the underside of the tappet. This clearance is arranged to provide sufficient clearance to accommodate all manufacturing tolerances in the various engine components involved so that it is impossible for the valve to be held off its valve seat in the cylinder head during the non-lifting period of the cam. This clearance can lie between the limits of .025" to .100" for example. The engine will continue to operate successfully with the tappet in this collapsed condition although with increased mechanical clatter.

The upper edge of the plunger may be cut away so that any air within the chamber would be expelled through the cut away portion. The cavity and chamber would soon be recharged with the correct amount of oil on the supply of normal air-free oil.

The provision of a "flap" type non-return valve enables the self adjusting tappet to be manufactured at extremely low cost. The use of this cylindrically shaped valve permits a very small plunger to be employed thus giving the minimum inertia loading to be resisted by valve spring pressure.

Machining costs may be considerably reduced by the expedient that the finish of the plunger outside diameter and of the bore in which the plunger slides, need not necessarily be of high quality as the small clearance space between the plunger and the bore is filled by the swelling action of the oil on the plunger, the oil pressure being very high during the lift period.

The very small travel required to seal the valve gives a minimum of unloading action and reduces the working tappet clearance to a minimum.

The inertia of the hinged flap is extremely small giving rapid sealing and unsealing of the channels.

Furthermore this valve has an advantage over the non-return ball-valve commonly used in known hydraulic tappet adjusters, in that the efficient sealing of the sleeve valve with the presence of particles of dust is less impaired than the sealing of the ball-valve under the same conditions.

What I claim is:

1. A self-adjusting tappet comprising an inverted pot cam follower, a bore in the follower, a plunger movably located in said bore for moving the engine valve and forming a chamber within said bore, said plunger having a clearance in the bore sufficient to permit a small leakage of hydraulic fluid from said chamber, said follower having a fluid supply channel whereby said chamber is fed with an hydraulic fluid, a valve in said bore permitting entry of fluid from said channel to said bore and preventing return flow of fluid, and a spring means urging the follower towards the cam and the plunger towards the valve.

2. A self-adjusting tappet as claimed in claim 1, wherein the valve is a flap valve in the form of a thin-walled flexible cylinder.

3. A self-adjusting tappet as claimed in claim 1, wherein the valve is in the form of an inverted pot having thin flexible walls.

4. A self-adjusting tappet as claimed in claim 1, wherein the follower is substantially cylindrical, having an end wall and a central boss in which the bore for the plunger is provided, said follower having an annular groove at a short distance from the end wall of the follower containing at least one of said supply channels which pass through the pot in a substantially radial direction to communicate with the bore.

5. A self-adjusting tappet as claimed in claim 1, wherein the plunger is a hollow cylindrical body containing said spring means and closed at one end by a wall which is in engagement with the tappet end of the stem of the engine valve, and said channel enters the chamber at a position adjacent the open end of the plunger.

6. A self-adjusting tappet as claimed in claim 1, wherein the plunger is relieved on its outer surface, adjacent the supply channels, for approximately half its length thereby forming a cylindrical space at the upper end of the bore which space contains the flap valve.

7. A self-adjusting tappet as claimed in claim 6, wherein the length of the flap valve is at least two thirds of the length of the relieved portion of the plunger.

8. A self-adjusting tappet as claimed in claim 1, wherein the flap valve is formed with slots on both sides of the position which is opposite to the opening of said supply channel, thereby providing flap portions.

9. A self-adjusting tappet as claimed in claim 1, wherein the valve is made of synthetic plastic material.

References Cited in the file of this patent

UNITED STATES PATENTS

| | | |
|---|---|---|
| 1,496,497 | Swarthout | June 3, 1924 |
| 1,892,129 | Barkeij | Dec. 27, 1932 |

FOREIGN PATENTS

| | | |
|---|---|---|
| 434,761 | Germany | Oct. 4, 1926 |